United States Patent [19]

Nicholson, Sr. et al.

[11] Patent Number: 4,993,875
[45] Date of Patent: Feb. 19, 1991

[54] PIPE SEALING AND ANTI-CORROSION SYSTEM

[75] Inventors: James J. Nicholson, Sr., Vacaville, Calif.; Erwin P. Miller, Clyde, Ohio; Daniel P. Walsh, Vallejo, Calif.; Steve A. Bowles, San Francisco, Calif.; John V. O'Brien, Vallejo, Calif.

[73] Assignee: Miller Pipeline Corp., Indianapolis, Ind.

[21] Appl. No.: 491,590

[22] Filed: Mar. 12, 1990

[51] Int. Cl.⁵ .................................... F16L 58/10
[52] U.S. Cl. .................................. 405/157; 405/154; 285/294
[58] Field of Search ............... 285/45, 284, 294, 297; 405/157, 184

[56] References Cited

U.S. PATENT DOCUMENTS

| | | |
|---|---|---|
| 2,899,984 | 8/1959 | Gaffin . |
| 3,151,631 | 10/1964 | Yano . |
| 3,467,141 | 9/1969 | Smith . |
| 3,677,303 | 7/1972 | Martin .......................... 285/294 X |
| 3,989,281 | 11/1976 | Wilde, Jr. . |
| 4,049,296 | 9/1977 | Harrison . |
| 4,469,469 | 9/1984 | Kennedy ............................ 405/157 |
| 4,932,810 | 6/1990 | Austin ............................ 405/154 X |

FOREIGN PATENT DOCUMENTS 3017632 11/1981 Fed. Rep. of Germany .

Primary Examiner—Randolph A. Reese
Assistant Examiner—Tim Aberle
Attorney, Agent, or Firm—Bacon & Thomas

[57] ABSTRACT

An anti-corrosion sealing assembly for use between a protective casement sleeve and a pipe to be protected is disclosed. The pipe extends through the protective casement sleeve such that an annular casement cavity is formed therebetween. The sealing assembly includes a muff arrangement secured between outer surface portions of the casement sleeve and the pipe at each end of the casement sleeve. More particularly, inner and outer muffs are secured about outer perimeter portions of the pipe and the casement sleeve at each end of the casement sleeve such that the outer muff totally encompasses the inner muff thereby forming a mold cavity therebetween. Each outer muff further includes a pouring spout into which a sealing compound may be poured. Furthermore, an injection tube extends through the inner and outer muffs and opens into the annular casement cavity to permit a corrosion inhibitor to be injected therein.

6 Claims, 1 Drawing Sheet

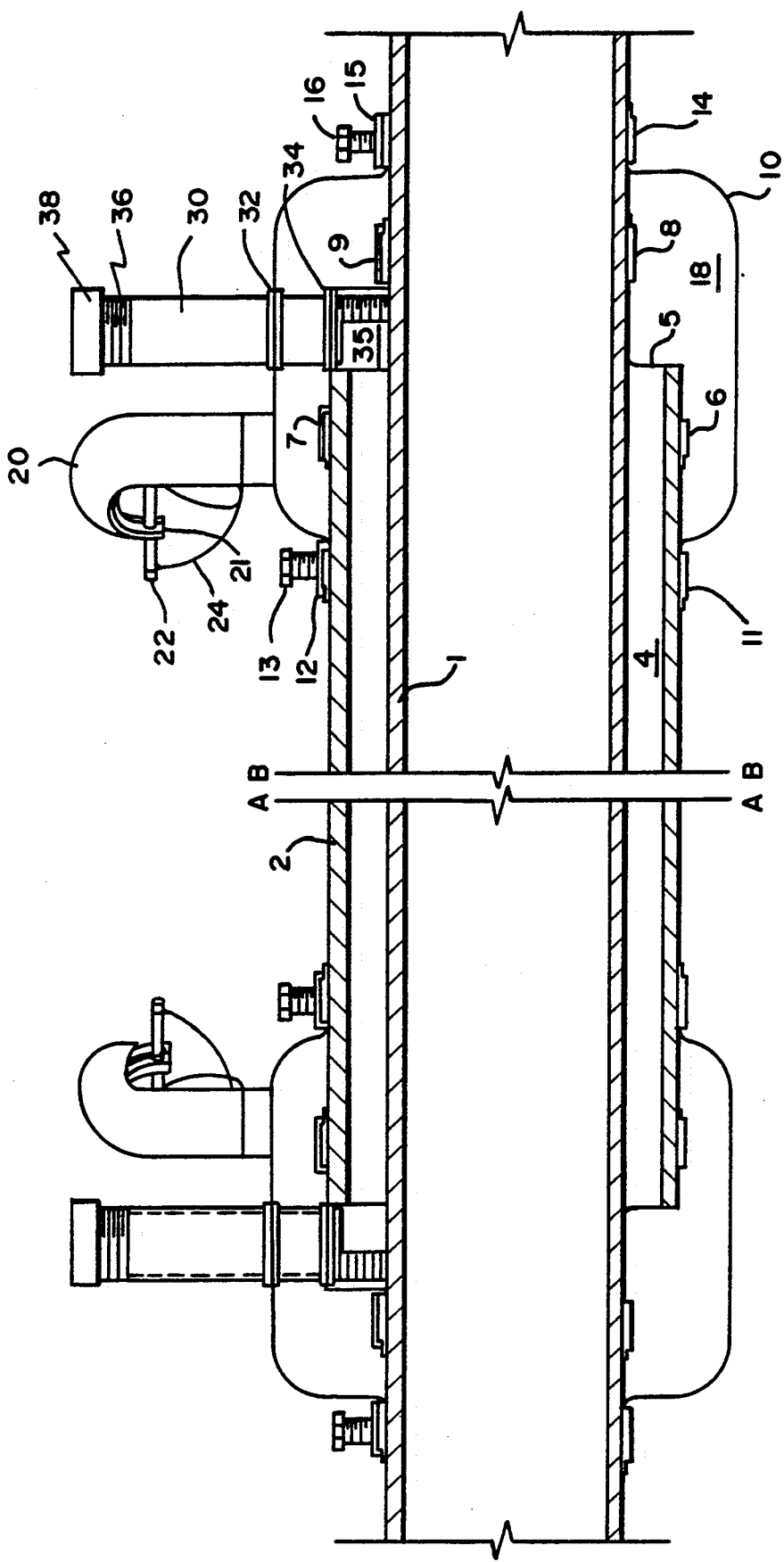

PIPE SEALING AND ANTI-CORROSION SYSTEM

BACKGROUND OF THE INVENTION

The present invention pertains to an assembly and method for protecting pipes. More specifically, the present invention pertains to a pipe protection arrangement in which a casement sleeve is placed around a pipe to be protected and then the outer ends of the casement sleeve are sealed against the pipe. Furthermore, the casement sleeve is spaced from the outer circumferential surface of the pipe such that an annular casement cavity is formed therebetween and the present invention provides means for injecting an anti-corrosion compound into this casement cavity.

Cross country pipelines must frequently pass beneath roads and railway beds. To assure adequate protection of these pipelines from damage due to vibration and/or crushing, the use of protective casement sleeves are often required by local regulations. The protective casement sleeves are designed to be sufficiently large to insulate the pipeline from the potential vibration and/or crushing damage.

A problem that arises with the casement configuration is corrosion. Many factors may contribute to this corrosion. Some factors include runoff from the overlying roadbed, runoff chemicals from surrounding farmlands, the nature of the soil, or a galvanic action between the pipeline and the casement itself.

Previous methods for preventing corrosion include a variety of techniques. In one such technique, zinc would be coated on the outside of the pipe and/or the inside of the casement sleeve. This method proved unsatisfactory since the zinc coating would be corroded away leaving the base pipe and/or casement sleeve again susceptible to corrosion damage. In another technique, anode cables would be buried in the ground adjacent to the pipe and electrically connected to the casement sleeve. A cathode line would also be connected to the pipe. Since the anode has a higher potential to corrode, pipe corrosion could be minimized. A further technique includes providing a coating of paint on the members to be protected. As with the zinc coating discussed above, the paint coating provides only temporary protection. None of these techniques have provided satisfactory corrosion protection in all cases.

SUMMARY OF THE INVENTION

The present invention remedies the problems associated with the prior art by providing an anti-corrosion sealing assembly between a protective casement sleeve and a pipe. The sealing assembly includes a muff arrangement secured between outer surface portions of the casement sleeve and the pipe at each end of the casement sleeve. More particularly, inner and outer muffs are secured about the outer perimeters of the pipe and the casement sleeve at each end of the casement sleeve such that the outer muff totally encompasses the inner muff thereby forming a mold cavity therebetween. The outer muff further includes a pouring spout that opens into the mold cavity and into which a sealing compound may be poured. Preferably, the sealing compound comprises liquid rubber or a two part polyurethane resin which is injected into the mold cavity and rapidly cures.

Furthermore, the protective casement sleeve is mounted about the pipe such that an annular casement cavity is formed therebetween. An injection tube extends through both the inner and outer muffs and opens into the casement cavity to permit a corrosion inhibitor to be injected therein. Preferably, the corrosion inhibitor may be an oil, grease, wax or other similar material. In this manner, the exterior surface of the pipe, the inner surface of the casement sleeve and the exposed inner surface of the muff are protected by the corrosion inhibitor.

These and other objects of the present invention will become more readily apparent by reference to the following detailed description of a preferred embodiment shown in the accompanying drawing.

BRIEF SUMMARY OF THE DRAWING

The figure is a cross-sectional view of a pipe and casement sleeve arrangement utilizing the pipe sealing and anti-corrosion system of the present invention.

BRIEF DESCRIPTION OF A PREFERRED EMBODIMENT

As represented in FIG. 1, a pipe 1 is surrounded by a casement sleeve 2. As shown, the pipe 1 extends through the casement sleeve 2. The casement sleeve 2 is adapted to extend about the pipe 1 for a considerable length depending upon the width of the road or railway bed under which the pipe 1 extends. Sectional lines A—A and B—B are used in FIG. 1 to indicate that the actual length of the pipe and sleeve are longer than as depicted.

The casement sleeve 2 surrounds a portion of pipe 1 and forms a generally annular casement cavity 4 therebetween. In order to seal between the casement sleeve 2 and the pipe 1 at each end of the casement sleeve 2, the present sealing system utilizes an inner and outer muff arrangement and a two-component, self-curing sealing compound. Since the sealing arrangement utilized at each end of the casement sleeve 2 is identical, reference will be made to the sealing assembly at one end of the casement sleeve 2 with the understanding that a symmetrical sealing assembly is utilized at the other end.

Each seal assembly comprises an inner muff 5 secured between an outer end portion of the casement sleeve 2 and an outer surface portion of the pipe 1. The muff may be secured to the casement sleeve 2 and the pipe 1 by any means known in the art. In the preferred embodiment, the inner muff 5 is secured to the casement sleeve 2 by means of a strap 6 which extends through a strap sleeve 7. The strap 6 is used to secure the inner muff 5 against the outer surface of the casement sleeve 2. A similar strap 8 and strap sleeve 9 are utilized for securing the inner muff 5 to the outer surface portion of the pipe 1.

An outer muff 10 is likewise secured between an outer surface portion of the casement sleeve 2 and the pipe 1. The outer muff 10 totally encompasses the inner muff 5 thereby forming an annular mold cavity 18 therebetween. Again, the outer muff 10 may be secured to the casement sleeve 2 and the pipe 1 by any means known in the art. In the preferred embodiment, the outer muff 10 is secured to an outer surface portion of the casement sleeve 2 by means of a strap 11 which extends around the casement sleeve 2 and through a strap sleeve 12. It is to be understood that the strap sleeve 12 is secured to an end of the strap 11. An additional securing bolt 13 may threadably extend through the strap sleeve 12 and tighten against the strap 11. In a similar manner, a strap 14, strap sleeve 15 and bolt 16 are utilized to secure the outer muff 10 against an outer surface portion of the pipe 1. As previously stated, the outer muff 10 is secured against the casement sleeve 2 and the pipe 1 so as to totally encompass the inner muff 5.

Each muff may be (preferably is) made of a fabric or rubber, but in applications in which the muff is subject to greater pressures, the fabric or rubber muff may be replaced by a two piece metal muff. In other applications in which the muff is subject to intermediate pressures, a fabric or rubber muff may be provided with reinforcing metal wraps. Also, each muff may be formed as an integral piece and placed around the casement sleeve prior to passage of the pipe 1 therethrough or it may open on one side thereby allowing the muff to be installed around the pipe and then clamped or zippered closed.

The outer muff 10 incorporates a pouring spout 20. The pouring spout may have an opening 21 which can be twisted to a closed position by means of a pin 22. The pin 22 may be tied or otherwise secured to the pouring spout 20 by means of a rope or wire 24. The pouring spout opens up into the annular mold cavity 18 formed between the inner and outer muffs 5 and 10 respectively. The pouring spout is used to guide a sealing compound, generally liquid rubber or a two part polyurethane resin, into the mold cavity. The sealing compound is injected through the pouring spout into the mold cavity, adheres to the surfaces in the cavity, and rapidly cures to provide a fluid tight seal. Once the mold cavity is filled, the top of the spout may be closed in order to pressurize the sealing compound. The outer muff may further have a vent (not shown) to allow air out of the mold cavity and a pressure gauge to measure the pressure within the cavity.

With respect to the anti-corrosion portion of the system, the sealing assembly includes means to allow a corrosion inhibitor to be injected into the annular casement cavity 4 formed between the pipe 1 and the casement sleeve 2. In order to allow for the injection of the corrosion inhibitor into this casement cavity 4, an injection tube 30 is provided which passes through and is sealed against both the inner and outer muffs 5 and 10 respectively. More specifically, the injection tube 30 extends through the outer muff 10 and is sealed thereagainst by means of a gasket 32. The injection tube 30 further extends through the inner muff 5 and is sealed thereto by means of a gasket 34. The injection tube 30 opens into the casement cavity 4 at 35 to permit the corrosion inhibitor to be injected therein. The corrosion inhibitor may be an oil, grease, wax or other similar material.

When injecting the corrosion inhibitor into the annular casement cavity 4 through the injection tube 30, the injection tube 30 on the other end of the casement sleeve is vented in order to allow air to escape from the annular casement cavity 4. The injection tubes 30 may be formed of any suitable material such as PVC, aluminum or galvanized piping. After the corrosion inhibitor has been injected into the annular casement cavity 4, the ends of the injection tube 30 may be sealed by means of a cap 38. In one embodiment, the external end of the injection tube 30 may be threaded such as that shown at 36 and the cap 38 may be threadably attached thereto.

Although disclosed with respect to a particular embodiment, it can be readily seen that various changes and/or modifications may be made without departing from the spirit or scope of the present invention. It is therefore intended that the present invention be limited only by the scope of the following claims.

We claim:

1. A sealing assembly for a pipe comprising:
    a casement sleeve means having first and second ends, said casement sleeve means adapted to surround a portion of a pipe with a generally annular casement cavity therebetween;
    first and second inner muff means, said first inner muff means being adapted to be secured about the outer perimeter portions of the pipe and said casement sleeve means at the first end of said casement sleeve means, said second inner muff means being adapted to be secured about outer perimeter portions of the pipe and said casement sleeve means at the second end of said casement sleeve means; and
    first and second outer muff means, said first outer muff means being adapted to encompass said first inner muff means and to be secured about an outer perimeter portion of the pipe and said casement sleeve means so as to form a first mold cavity, said second outer muff means being adapted to encompass said second inner muff means and to be secured about an outer perimeter portion of the pipe and said casement sleeve means so as to form a second mold cavity.

2. A pipe sealing assembly as claimed in claim 1 wherein each of said first and second outer muff means includes a pouring spout means which opens into said first and second mold cavities respectively for injecting a sealing compound therein.

3. A pipe sealing assembly as claimed in claim 2 further comprising an anti-corrosion means including an injection tube passing through and sealed to said first inner muff means and said first outer muff means, said injection tube opening into said annular casement cavity for injecting an anti-corrosion compound therein.

4. A pipe sealing assembly as claimed in claim 2 wherein said sealing compound comprises a single component, liquid rubber that flows while warm into said mold cavities and becomes rigid upon cooling to form a flexible solid seal.

5. A method for sealing a protective casement sleeve about a pipe to be protected comprising the steps of:
    placing a casement sleeve having first and second ends about a pipe with a generally annular casement cavity therebetween;
    securing an inner muff around outer perimeter portions of both the pipe and the casement sleeve at each end of the casement sleeve;
    securing an outer muff around an outer perimeter portion of both the pipe and casement sleeve at each end of the casement sleeve so that each inner muff is entirely encompassed by a respective outer muff thereby forming a mold cavity therebetween; and
    injecting a sealing compound into each of said mold cavities.

6. A method for sealing a protective casement sleeve about a pipe to be protected as recited in claim 5 further comprising the step of injecting an anti-corrosion compound into said annular casement cavity.

* * * * *